United States Patent [19]
Geiger

[11] Patent Number: 6,126,141
[45] Date of Patent: Oct. 3, 2000

[54] IRRIGATION SYSTEM VALVE CONTROLLER EXPANSION APPARATUS

[76] Inventor: James E. Geiger, 1848 Germaine Dr., Yuba City, Calif. 95993

[21] Appl. No.: 09/227,452

[22] Filed: Jan. 8, 1999

Related U.S. Application Data

[60] Provisional application No. 60/071,071, Jan. 9, 1998.
[51] Int. Cl.$^7$ ................................................. F16K 31/02
[52] U.S. Cl. .................... 251/129.01; 239/69; 307/64; 361/167; 361/168.1
[58] Field of Search ..................... 251/129.01; 239/67, 239/69; 307/64, 66, 126; 361/166, 167, 168.1

[56] References Cited

U.S. PATENT DOCUMENTS

| | | | |
|---|---|---|---|
| 3,521,130 | 7/1970 | Davis et al. | 361/168.1 |
| 3,723,827 | 3/1973 | Griswold et al. | 361/166 |
| 4,575,004 | 3/1986 | Geiger . | |
| 4,724,505 | 2/1988 | Gelbort | 361/167 |
| 4,985,638 | 1/1991 | Brock . | |

OTHER PUBLICATIONS

"Add'A–Zone", R Co. Parts, Pleasanton, CA, 1996.
"Double Switch", R Co. Parts, Pleasanton, CA, 1996.
"Controllers", Gardener, 4 & 6 Station Residential Controller, Holman Distributors, 10–12 Southport, Leederville, New South Wales, Australia Aug. 23, 1996.

"Irrigation Controls", Two–Up Valve Adaptor, Holman Distributors, 10–12 Southport Street, Leederville, New South Wales, Australia Oct. 17, 1995.

"Irrigation Controls", Solenoid Booster Parts A & B, Holman Distributors, 10–12 Southport, Leederville, New South Wales, Australia Aug. 23, 1996.

"Irrigation Controls", Splitter, Holman Distributors, 10–12 Southport, Leederville, New South Wales, Australia Aug. 23, 1996.

"Irrigation Controls", Valve Locator, Holman Distributors, 10–12 Southport Street, Leederville, New South Wales, Australia Aug. 23, 1996.

"Controller", Model 3414–6,9 & 14 Station, Holman Distributors, 10–12 Southport Street, Leederville, New South Wales, Australia Aug. 23, 1996.

*Primary Examiner*—John Rivell
*Attorney, Agent, or Firm*—John P. O'Banion

[57] ABSTRACT

An irrigation system valve controller which provides for alternating operation of two conductive output paths from a single energizing input source. The valve controller allows adding new valves to an existing automatic sprinkler system without having to route additional wire between the new valves and the existing system controller, and provides independent control of each valve using a single pair of input power leads from the existing controller.

7 Claims, 2 Drawing Sheets

IRRIGATION SYSTEM VALVE CONTROLLER EXPANSION APPARATUS

CROSS-REFERENCE TO RELATED APPLICATIONS

This application claims priority from U.S. provisional application Ser. No. 60/071,071 filed on Jan. 9, 1998.

BACKGROUND OF THE INVENTION

1. Field of the Invention

This invention pertains generally to remote control of irrigation valves, and more particularly to an apparatus for permitting multiple solenoid operated irrigation valves to be controlled from a single control line from an irrigation controller.

2. Description of the Background Art

Landscape sprinkler systems are inherently inflexible. Water is supplied through a pipe which limits its volume so strategically placed valves are used to divide the water among many landscaped areas. Automatic control of these valves is usually electrical which requires a control wire for each valve and a common return wire to all valves. Once an automatic sprinkler system is installed it is both difficult and expensive to increase the number of control wires.

A drop in water pressure requires more valves to further divide the sprinkler systems and a broken wire in an inaccessible place necessitates a major expense to reroute it. Land use changes such as new buildings, parking lots and roadways often require more valves than did the previous large uninterrupted landscape.

In attempting to add some flexibility to this rigid system in a practical way, many devices have been proposed. For example, U.S. Pat. No. 4,985,638 to Brock, which is incorporated herein by reference, and U.S. Pat. No. 4,575,004 to Geiger, which is also incorporated herein by reference, attest to the importance of such devices, but deficiencies still remain. One such deficiency is that devices such as shown in U.S. Pat. No. 4,575,004 require continuous power, as do all of the competing products. The requirement of continuous power makes such units unsuitable for use with certain controllers. For example, some controllers, such as the Irritrol IBOC, are battery powered for use where there is no electric utility available such as highway overpasses, traffic islands and isolated parks. An irrigation system designed for the Irritrol IBOC cannot use standard controllers or valve solenoids because of the unique way the system operates. To conserve batteries, the Irritrol IBOC valve solenoids are latched magnetically by a short, polarized electric pulse from the controller. An 18-volt DC pulse sent through the field circuit in one direction for 20 ms will open a valve. At the end of the programmed watering time, a 24 volt DC pulse sent through the same circuit for 20 ms in the opposite direction will close the valve.

New control technology has added new problems too, such as "self diagnostic" circuits in the central controller which shuts down individual field circuits rather than the entire controller. The development of very low power valve actuators has invited controller manufacturers to develop complex electronic designs as well as very inexpensive residential controllers. This further tightens the parameters of any device inserted into the field circuitry.

Therefore, there is a need for a valve controller expansion apparatus that is compatible with the various controllers commercially available, including those which operate on battery power. The present invention satisfies the needs of the industry and overcomes the deficiencies in conventional control systems in a way that is novel and nonobvious.

BRIEF SUMMARY OF THE INVENTION

The present invention is an irrigation system valve controller which provides for alternating operation of two conductive output paths from a single energizing input source. The invention allows the addition of new valves to an automatic sprinkler system without having to route additional lengths of wire between the new valves and the existing controller. The invention is wired in series between the existing controller and the new valves to provide independent control of each valve using a single pair of input power leads from the existing controller.

One embodiment of the invention generally comprises a pair of independent circuit output paths, a pair of DPDT output relays dedicated to each output path, a dual-coil magnetic latching relay in series between the energizing input source and each DPDT output relay and a diode-capacitor combination capable of storing a charge. The dual-coil magnetic latching relay actuates the switch within each DPDT output relay which either energized or de-energizes its respective output path. The latch within the dual-coil magnetic latching relay which controls the DPDT relays is actuated by a charge from the capacitor after power from the input source is turned off. Thus, switching between the circuit output paths is done when the apparatus is off, providing the ability to switch a large amperage power input and eliminating the need to momentarily energize the valves while switching occurs which reduces power consumption.

Another embodiment of the invention follows the same basic operational concept but is configured for use with the Irritrol IBOC battery operated controller and other similar battery operated controllers. However, only two relays are required.

An object of this invention is to enable separate control of more than one valve using only the two control wires of an existing valve.

Another object of the invention is the ability to repeatedly switch the large ampere output of some commercial sprinkler controllers.

A further object of the invention is to consume a very small amount of electrical power in the switching circuit to accommodate small residential controllers and "self diagnostic" control systems.

Still another object of the invention is to allow for multiple units to be assembled into a logic cascade circuit for individual control of many valves by the two control wires.

A still further object of the invention is to be entirely controllable by the central sprinkler controller in frequency and timing of the power on cycles.

The first and last objects have been accomplished by the circuit design. The second and third objects of the invention have been satisfied by the use of relays instead of electronic circuitry to provide a large switching capacity using very little power in a simple and economical package.

The fourth object of the invention is met by employing a circuit that switches after the supply current is turned off. Other devices used for this purpose switch when the electricity is turned on, resulting in the previous valve being turned on momentarily while the switching takes place. This eliminates any possibility of the units being cascaded and increases the power surge which tends to overload small controllers and trip "self-diagnostic" controllers.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Figure 1:
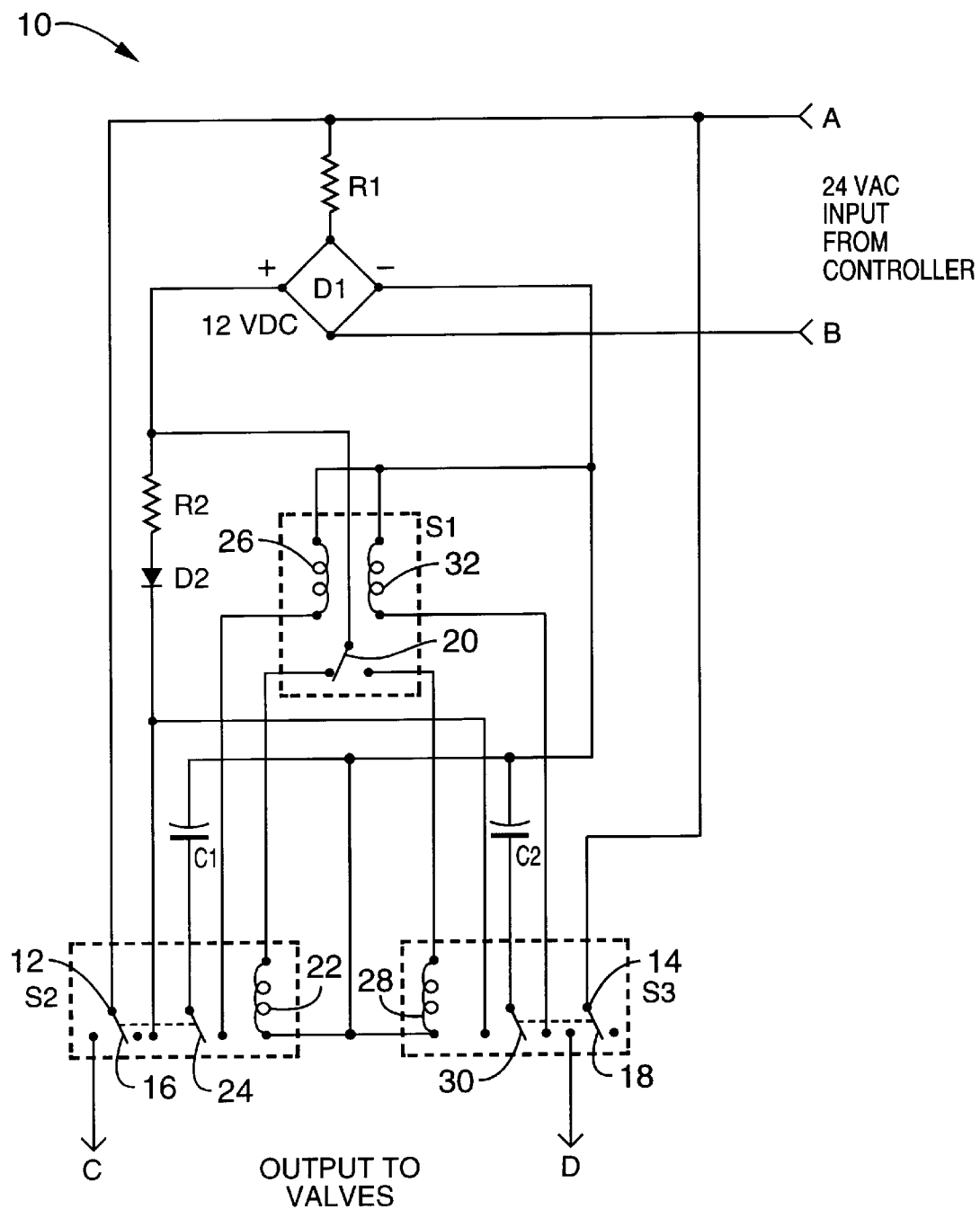
FIG. 1 is a schematic diagram of an embodiment of the present invention.

Referring first to FIG. 1, a valve controller expansion apparatus 10 in accordance with the present invention is shown. It will be appreciated that the apparatus may vary as to configuration and as to details of the parts without departing from the basic concepts as disclosed herein.

In operation, 24 volts AC is supplied intermittently to apparatus 10, according to a prescribed program, by a conventional irrigation controller (not shown). When the controller switches the power on ("on signal"), the current enters the apparatus 10 through power input connections A and B. Input A is routed to a common terminal 12, 14 of each output relay S2 and S3, respectively, which are both a normally open DPDT relay such as a Potter & Brumfield RKS-11DX-12 or equivalent switching device. The contacts 16, 18 on relays S2 and S3, respectively, are in a normally open position, as shown in FIG. 1, with respect to output connections C and D, respectively.

Input A is also connected through a current limiting resistor R1, which is typically a 180 ohm resistor, to a bridge rectifier D1 which, in the circuit shown, is rated at 1.5 amps. Input B, which is connected to bridge rectifier D1, completes the circuit. AC power supply current is converted to 12-volt DC, which passes through the contacts 20 of latching relay S1, which is a dual coil magnetic latching relay such as a Potter & Brumfield V23042-B2203-B101 or equivalent switching device, to the coil 22 of relay S2. When S2 moves to its active state position, output C is connected to the 24-volt AC input A.

A second set of contacts 24 in relay S2 simultaneously connects capacitor C1 which, in the circuit shown is 33 µf, to the positive side of the 12-volt DC power through a surge limiting resistor R2 which, in the circuit shown is 1000 ohm, and diode D2 such as a 1N4004 or the like. Capacitor C1 charges and remains at potential until the irrigation controller shuts down the circuit to apparatus 10.

When the 24V AC is turned off by the irragation controller ("off signal"), the 12-volt DC power dissipates through the coil 22 of relay S2, but the charge in capacitor C1 is maintained by diode D2. Then, with relay S2 in its relaxed state, capacitor C1 is connected through contact 24 of relay S2 to one of the switching coils 26 of relay S1, causing it to switch to relay S3. The position of the contacts in relay S1 is held magnetically and the next power up from the irrigation controller repeats the sequence, using relay S3 instead of S2 in which the 12-volt DC power dissipates through the coil 28 of relay S3, but the charge in capacitor C2 is maintained by diode D2. With S3 in its relaxed state, capacitor C2 is connected through S3 contact 30 to the other switching coil 32 of relay S1, causing it to switch back to relay S2. The following off cycle returns the circuit to relay S3 output again. C2 is also typically a 33 µf capacitor.

Figure 2:
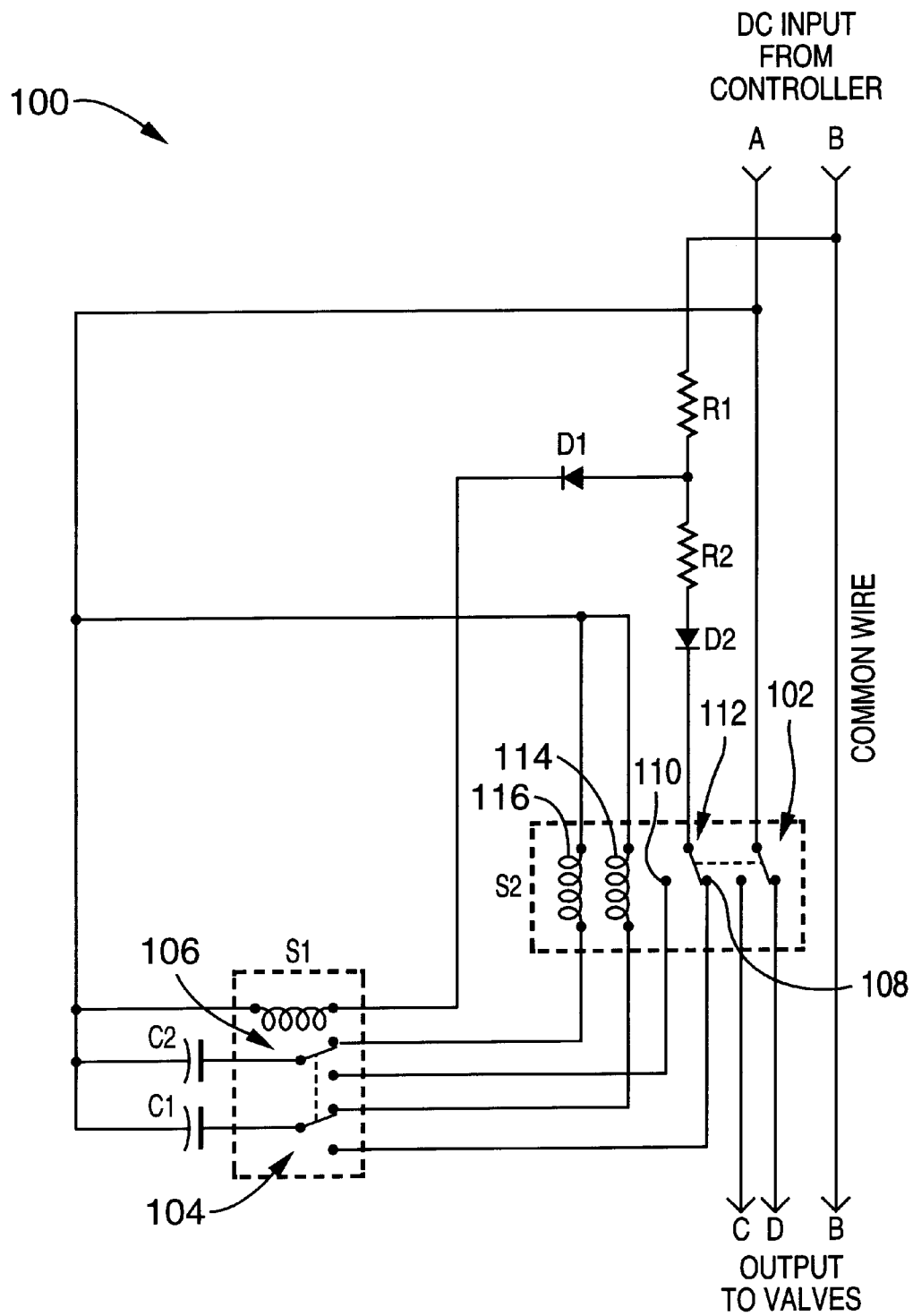
FIG. 2 is a schematic diagram of an alternative embodiment of the present invention.

Referring now to FIG. 2, an alternative embodiment 100 is shown. This embodiment is configured for use with battery operated controllers, such as the Irritrol IBOC, and is powered by direct current (DC) supplied by the controller. For discussion purposes, the voltage levels of the Irritrol IBOC will be used, although those skilled in the art will appreciate that other voltage levels could apply.

FIG. 2 shows latching relay S2, which is a conventional latching relay or equivalent switching device, in the set position. When the controller opens a valve it sends a polarized voltage signal which, in the case of an Irritrol IBOC is typically a short 18-volt DC pulse ("on signal") where input A is positive and input B is negative. Diode D1 blocks the flow of current in that direction so the circuit does not operate. Input A is connected to output D through contacts 102 in latching relay S2 which transmits the current to the appropriate valve. When the controller closes a valve, it sends a short pulse of opposite polarity ("off signal") where input A becomes negative and input B becomes positive. Current flows through resistor R1 which limits the voltage to 12 Volts DC and through diode D1 to activate relay S1, which is a conventional relay or equivalent switching device. When the contacts 104, 106 of relay S1 close, the two capacitors C1 and C2 are connected to terminals 108, 110 of contacts 112 in latching relay S2, respectively. Input A is also connected to S2 through R2 and D2 which charges capacitor C1. R2 slows the current inrush and D2 holds the charge on C1 after the controller turns off the power. With the current turned off, relay S1 relaxes and its contacts 104,106 move to connect the capacitors to the reset 114 and set 116 coils of latching relay S2. Capacitor C1 discharges through the reset coil 114 of S2 and latches it in the opposite direction. Note that capacitor C2 was not charged. The next power up from the controller will repeat this sequence using output C instead of output D and charging capacitor C2 instead of capacitor C1. Capacitor C2 will be discharged through the set coil 116 of S2 to magnetically latch it again in the position shown in FIG. 2. As can be seen, therefore, the circuit requires only a short voltage pulse to charge the capacitor for operation instead of requiring a constant supply of power as in conventional devices. Furthermore, it will be seen in this circuit that switching will occur each time a negative voltage is applied and removed; that is, each time a negative pulse is received.

Those skilled in the art will appreciate that, while mechanical relays are shown, solid state equivalents could be substituted and are considered to be within the scope of the invention. It will be additionally appreciated that other mechanical relay configurations which operate in the manner described are considered to be within the scope of this invention. Accordingly, it will be seen that this invention provides for alternating operation of two valves from a single irrigation control circuit. Although the description above contains many specificities, these should not be construed as limiting the scope of the invention but as merely providing illustrations of some of the presently preferred embodiments of this invention.

What is claimed is:

1. An irrigation valve controller expansion apparatus, comprising:

(a) a latching circuit for receiving an external source of power from an irrigation controller and connecting said power source to either a first output path or a second output path; and (b) a switching circuit for switching between said output paths when an off-signal is received from said irrigation controller, wherein said latching circuit maintains a connection to an output path until an on-signal followed by an off-signal is subsequently received from said irrigation controller;

(c) wherein said latching circuit and said switching circuit do not require a continuous supply of power for operation.

2. An apparatus as recited in claim 1, wherein said external source of power comprises an alternating current power source, said on-signal comprises energization of said source of power, and said off-signal comprises de-energization of said source of power.

3. An apparatus as recited in claim 1, wherein said external source of power comprises a direct current power source, said on-signal comprises energization of said power source, and said off-signal comprises subsequent energization said power source with opposite polarity.

4. An apparatus as recited in claim 1, wherein said external source of power comprises a direct current power source, said on-signal comprises energization of said power source with a positive polarity, and said off-signal comprises subsequent energization of said power source with a negative polarity.

5. An irrigation valve controller expansion apparatus, comprising:

(a) a latching circuit for receiving an external source of alternating current power from an irrigation controller and connecting said power source to either a first output path or a second output path; and (b) a switching circuit for switching between said output paths when said external power is removed from said latching circuit, wherein said latching circuit maintains a connection to an output path until said external power is subsequently applied and then removed;

(c) wherein said latching circuit and said switching circuit do not require a continuous supply of power for operation.

6. An irrigation valve controller expansion apparatus, comprising:

(a) a latching circuit for receiving a external source of direct current power from an irrigation controller and connecting said power source to either a first output path or a second output path; and (b) a switching circuit for switching between said output paths when said external power is removed and subsequently applied with opposite polarity, wherein said latching circuit maintains a connection to an output path until said external power source is subsequently applied with an opposite polarity and then removed;

(c) wherein said latching circuit and said switching circuit do not require a continuous supply of power for operation.

7. An apparatus as recited in claim 6, wherein switching circuit switches outputs each time said external power source is applied with a negative polarity.

* * * * *